Nov. 9, 1948.  E. W. PETRI ET AL  2,453,587
LAWN MOWER
Filed July 5, 1944  3 Sheets-Sheet 1
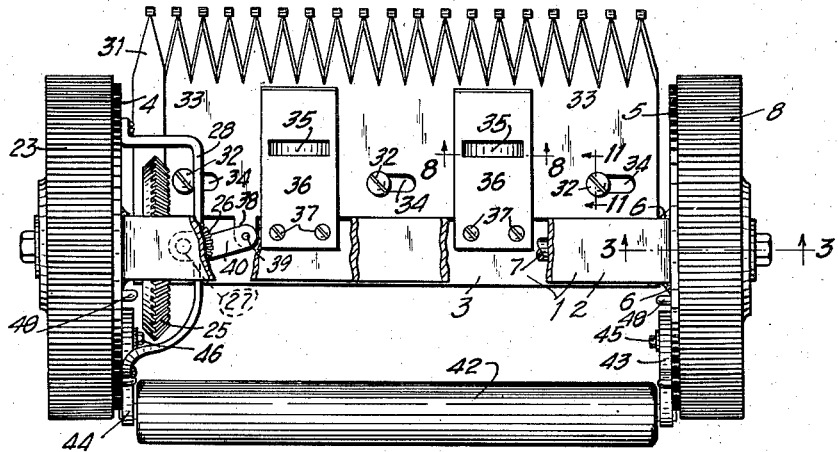
FIG. 1
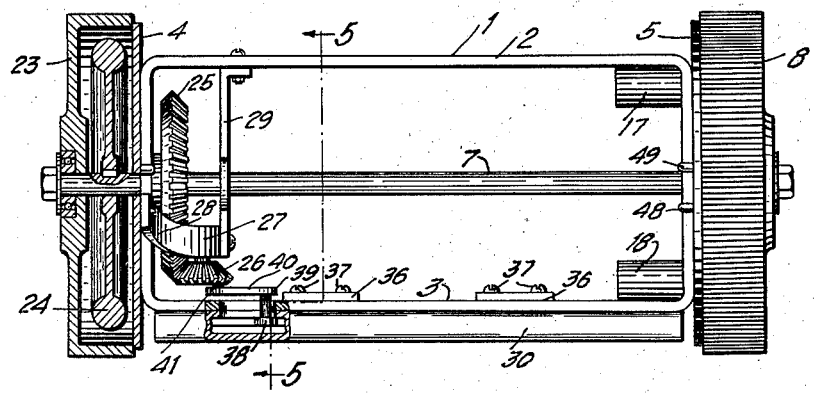
FIG. 2
INVENTORS
Edward W. Petri
BY Frank H. Seeley
ATTORNEY Nov. 9, 1948.   E. W. PETRI ET AL   2,453,587
LAWN MOWER
Filed July 5, 1944   3 Sheets-Sheet 3

INVENTORS
Edward W. Petri
BY Frank H. Seeley
ATTORNEY

Patented Nov. 9, 1948

2,453,587

UNITED STATES PATENT OFFICE 2,453,587

LAWN MOWER

Edward W. Petri and Frank H. Seeley,
Fort Plain, N. Y.

Application July 5, 1944, Serial No. 543,520

3 Claims. (Cl. 56—260)

Our invention relates to lawn mowers and particularly to lawn mowers of the oscillating cutting bar type as distinguished from mowers having the conventional rotating cutting blades. One of the objects of our invention is to provide a lawn mower which is adapted to cut grass growing close to building foundations and the like which is impossible with the ordinary rotary blade cutters. Another object is to provide a lawn mower having fixed and oscillating cutting bars which are easily removable for sharpening and for replacement. Another object is to provide a lawn mower of this type which can be pushed into contact with an object, such as a building foundation and in which the movable cutting bar will continue to oscillate for a short period after the forward motion of the machine has stopped. A further object is to provide a lawn mower of such general design that it is adapted with minor modifications for use either as a hand operated or power operated machine.

With these objects in view our invention includes the novel combination and arrangement of elements described below and illustrated in the accompanying drawing in which—

Fig. 1 is a fragmentary top plan view of a hand operated machine with certain portions thereof broken away to disclose details of construction;

Fig. 2 is a fragmentary rear view, partially in section, of the machine shown in Fig. 1;

Figure 4:
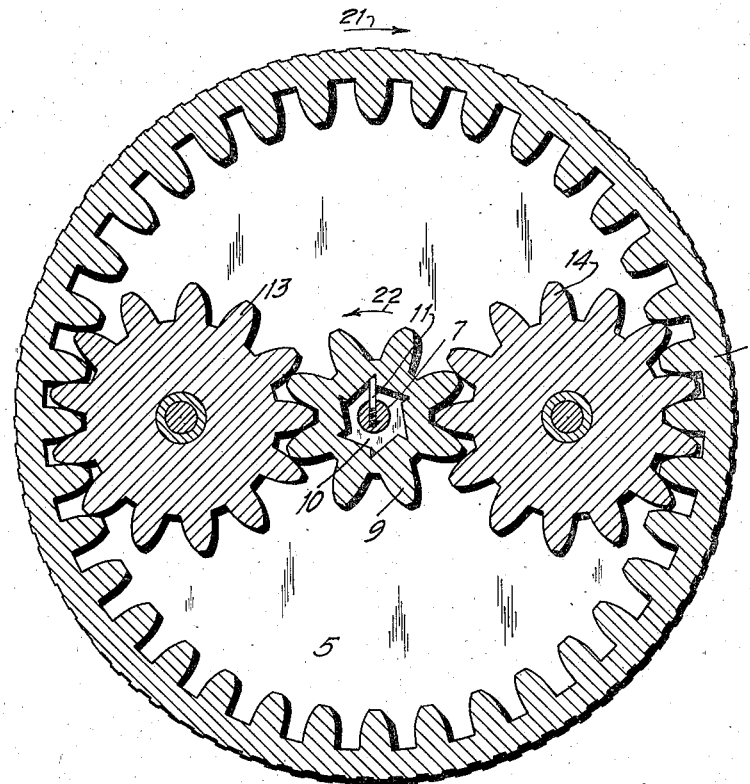
Fig. 4 is a section of Fig. 3 in the plane 4—4.

Referring to the drawings, our lawn mower comprises a vertically-disposed, rectangular metal frame 1 having a top member 2, a bottom member 3, and end plates 4 and 5 secured thereto by welding 6 or otherwise. Extending longitudinally of the frame and through the end plates 4 and 5 is a shaft 7.

Figure 3:
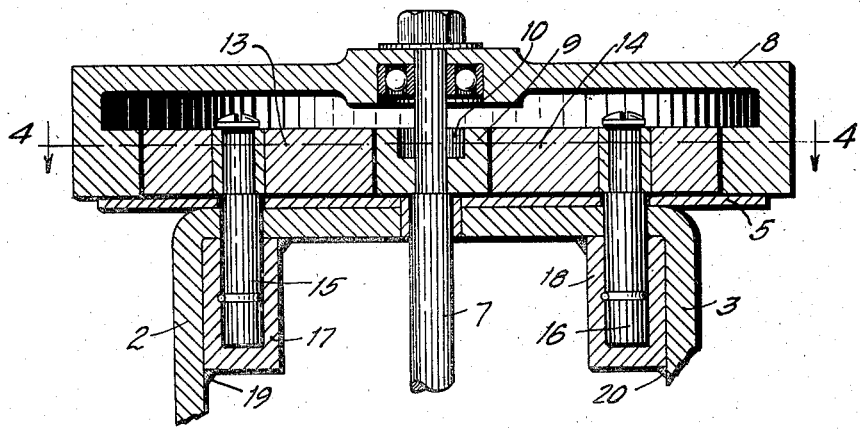
Fig. 3 is an enlarged fragmentary sectional view in the plane 3—3 of Fig. 1, and which said view, for convenient inspection, has been revolved 90° in a counterclockwise direction so that it appears horizontal instead of vertical.
Figure 9:
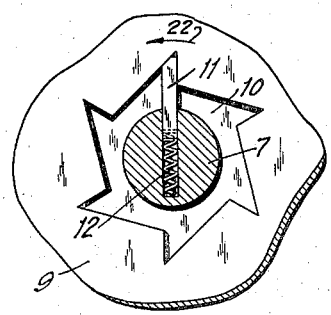
Fig. 9 is an enlarged fragmentary elevation view partially in section showing a part of the driven wheel and a pawl cooperating therewith which permits the shaft to override the gear.

Rotatably mounted on one end of the shaft is an internal gear 8 which serves as one of the ground wheels. Rotatably mounted on the shaft 7 and within the internal gear 8 is a driven gear 9. This gear has a recess 10 (see Figs. 3 and 4) in one end thereof forming an internal ratchet which cooperates with a pawl 11 in the shaft that is normally urged into contact with the ratchet by the helical spring 12. Cooperating with the internal gear 8 and the driven gear 9 are two idler gears 13 and 14 which are rotatably mounted on studs 15 and 16 secured, respectively, in bosses 17 and 18 which are welded to the inside of the frame as shown at 19 and 20. From the foregoing and particularly from a consideration of Figs. 4 and 9 it will be apparent that when the internal gear 8 rotates in the direction of the arrow 21 shown in Fig. 4 the driven gear 9 will rotate in the direction of the arrow 22 and thus effect a rotation of the shaft 7 through the cooperation of the internal ratchet in the gear 9 with the pawl 11. On the other hand, as viewed in Figs. 4 and 9 the shaft may override the gear 9 in a counterclockwise direction.

Rotatably mounted on the other end of the shaft 7, as best shown in Fig. 2, is a second ground wheel 23 and keyed to the shaft 7 within this ground wheel is a fly wheel 24. Also secured to the shaft 7 is a driving bevel gear 25 meshing with the smaller driven bevel gear 26 which is rotatably mounted in a bearing 27 supported by the bracket 28 secured to the end plate 4 and the hanger 29 secured to the top member 2 of the frame.

Figure 6:
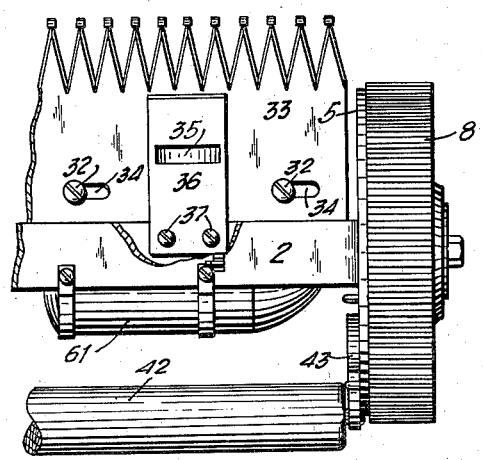
Fig. 6 is a fragmentary top plan view with portions broken away and showing the application of an electric motor to the mower for power operation.
Figure 10:
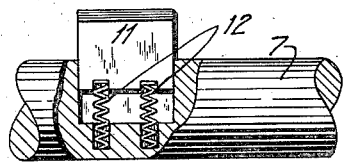
Fig. 10 is a fragmentary elevation view of the shaft and pawl.
Figure 5:
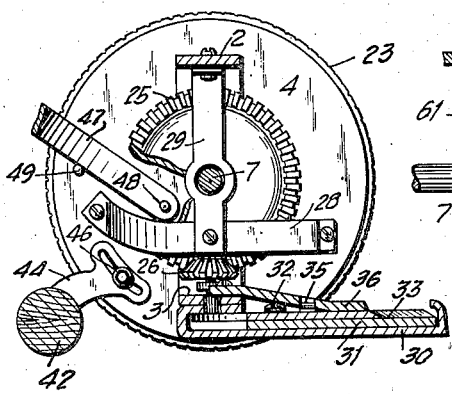
Fig. 5 is a fragmentary section of Fig. 2 in the plane 5—5 with certain parts broken away.
Figures 8, 11:
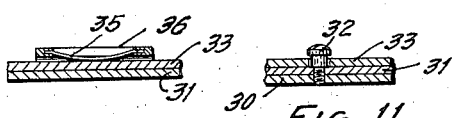
Fig. 8 is a fragmentary section of Fig. 1 in the plane 8—8.
Fig. 11 is a fragmentary section of Fig. 1 in the plane 11—11.

Secured to the bottom element 3 of the frame 1, by welding or otherwise, is the cutter guard 30, best shown in Fig. 5. Supported on the cutter guard 30 is a stationary cutter bar 31 which is detachably secured to the guard 30 by means of the screws 32 which also serve as guides for the oscillating cutting bar 33. The screws 32 pass through slots 34 in the oscillating cutting bar, as best shown in Figs. 1, 6 and 11. The oscillating cutting bar is simply supported in sliding contact on the stationary bar and is held in yielding contact therewith by means of the springs 35 (see Figs. 1, 6 and 8) mounted in the plates 36 which, in turn, are detachably secured to the bottom frame element 3 by means of the screws 37. A tongue 38 which is integral with the movable cutting bar 33 cooperates with the pin 39 and a link 40 connects this pin with a crank pin 41 on the bottom of the bevel gear 26. Thus, as the bevel gear rotates the movable cutting bar is oscillated.

To regulate the length to which the grass is cut and also to form a stable wheel base for the mower a roller 42 is provided which is adjustably secured to the side plates 4 and 5 by slotted plates 43 and 44 and cap screws 45 and 46.

The usual handle for hand operation is understood to be provided and a fragmentary portion thereof 47 is shown in Fig. 5. The handle is pivoted to the end plates 4 and 5 as shown at 48 in Fig. 5, and a stop 49 prevents the handle from falling to the ground when released by the operator.

Figure 7:
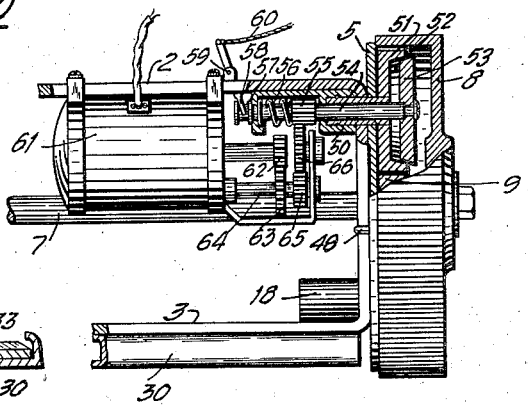
Fig. 7 is a fragmentary rear elevation view, with certain portions removed or broken away, of the power operated mower shown in Fig. 6.

In Figs. 6 and 7 we have shown a modification for motor operation. Here, instead of the boss 17, a special boss 50 is substituted therefor, and the gear 13 is replaced by a special gear 51 having a frusto conical recess 52 in one end thereof which functions as a female clutch member. A male clutch member 53 is secured to the sliding shaft 54 having a wide faced pinion 55 also mounted thereon. A helical spring 56 normally urges the clutch into disengaged position, and to engage the clutch a collar 57 and a shifting yoke 58 cooperating therewith is provided. The yoke is pivoted at 59, and the clutch is engaged by pulling on the cable 60 which may be Bowden wire and which, it is understood, extends to a position on the handle of the mower where it is readily accessible to the operator. A motor 61, here shown as an electric motor, is secured to the top element 2 of the frame. The main shaft of the motor is provided with a gear 62 which is in mesh with gear 63 on counter shaft 64, and a second gear 65 on the counter shaft cooperates with an idler gear 66 which is in mesh with the pinion 55.

In operation, the motor drives the ground wheel 8 and also the shaft 7 and its associated parts through the cooperation of gear 51 with gear 9.

From the foregoing it will be apparent that the clutch is normally out of engagement and hence the motor is normally running free. Thus in order to drive the machine forward the operator must hold the clutch in engagement against the pressure of spring 56 and to stop the forward motion of the machine, the operator simply releases the clutch.

In either hand or motor operation the fly wheel 24 will turn with the shaft 7 at fairly high speed and therefore have considerable inertia. Hence, when the forward motion of the motor is suddenly stopped, as for example when it is pushed up against a building foundation, the gear 17 will cease to rotate but the shaft 7, due to the inertia of the fly wheel, will continue to rotate and override the gear 7. Thus the cutting bar will continue to oscillate for a short time after forward motion of the machine has ceased.

From a consideration of Fig. 5 it will be apparent that the large bevel gear 25 rotates in a counterclockwise direction when the machine is moving ahead. This is quite important because twigs or other obstructions occasionally may be encountered by the oscillating cutting bar which may suddenly stop its movements. When this occurs the small bevel gear 26 ceases to rotate and hence there is a tendency for it to be carried around the shaft 7 in the same direction that the large bevel gear is rotating. In other words, obstructions in the cutting blades tend to raise the front end of the guard bar instead of tending to drive it downwardly into the ground. The reaction to sudden stoppage of the knives which tends to turn the frame and all of its attached parts in a counterclockwise direction is taken by the roller 42; the tendency being to push the roller into the ground.

By utilizing a frame having top and bottom transversely extending members secured to the end plates we have provided an extremely light, simple base structure to which substantially all of the essential mechanism of the mower may be secured. There is substantially no structural difference between a hand operated and a motor operated model. A hand operated model may be readily converted into a motor operated model by merely changing the boss 17 to a boss such as 50, substituting the clutch and gear shown in Fig. 7 for the gear 13, and securing the motor and its associated gears to the upper member of the frame. Thus, manufacturing difficulties are eliminated because production of radically different models for motor and hand operation is eliminated. By positioning the clutch inside one of the wheels and utilizing one of the gears as a female clutch element, the clutch is protected from dirt and less parts are required.

While we have described our invention in its preferred embodiment it is to be understood that the words which we have used are words of description rather than of limitation and that changes within the purview of the appended claims may be made without departing from the true scope and spirit of our invention.

What we claim is:

1. A lawn mower comprising a pair of spaced ground wheels, a shaft on which said wheels are rotatably mounted; one of said wheels having gear teeth therein forming an internal gear; a vertically-disposed, rectangular, open frame having an end plate thereon closely adjacent each of said gears; one of said plates forming with one of said wheels a substantially enclosed fly wheel housing, and the other of said plates forming with said internal gear wheel a substantially enclosed gear housing; a flywheel secured to said shaft within said flywheel housing, a first gear rotatably mounted on said shaft within said gear housing and a ratchet and pawl cooperating with said first gear and said shaft whereby said gear may drive said shaft but said shaft may override said gear; a pair of gears enclosed within said gear housing, each cooperating with said internal gear and said first gear and one of said two gears being provided with means forming a female clutch member, a male clutch member enclosed in said housing adapted to cooperate with said female member and having a shaft slidably mounted in a bearing secured to said frame, a motor mounted on said frame, speed reducing gears cooperating therewith and with said male clutch shaft for driving the same, a stationary cutting bar and a movable cutting bar cooperating therewith carried by the bottom of said frame, and mechanism driven from said first mentioned shaft for oscillating said movable bar.

2. In a lawn mower of the oscillating cutting bar type, including an internal gear forming one of two spaced ground wheels for said mower, a main driving shaft on which said wheels are rotatably mounted and mechanism cooperating with said shaft for oscillating said cutting bar, a driving means for said mower and said shaft comprising a driven gear on said shaft, a driven clutch element having gear teeth thereon in mesh with said internal gear and said driven gear, means enclosing said driven gear and driven clutch element within said internal gear, a driving clutch element enclosed within said internal gear and adapted to cooperate with said driven clutch element, resilient means normally holding said clutch elements out of cooperative relation, means for manually holding said clutch elements in cooperative relation, and a motor and speed reducing gears cooperating with said motor and with said driving clutch element for driving said mower.

3. A lawn mower comprising the combination with an internal gear forming a ground wheel for said mower, of a shaft on which said ground wheel is rotatively mounted, a frame supported on said shaft, a stationary cutting bar supported on said frame, a movable cutting bar cooperating with and supported on said stationary bar, an electric motor supported on said frame, a driven gear on said shaft, a driving gear cooperating therewith and with said internal gear for propelling said mower and also for driving said shaft; said driving gear being provided with means forming one member of a clutch mechanism; means cooperating with said internal gear to form an enclosure for said driving gear and said driven gear within said internal gear, whereby to protect the same, mechanism operatively connecting said shaft with said movable cutting bar for oscillating said bar, a second clutch member enclosed within said internal gear and adapted to cooperate with said first mentioned clutch member, means operatively connecting said motor with said second clutch member, and manually operable means for actuating said clutch mechanism.

EDWARD W. PETRI.
FRANK H. SEELEY.

REFERENCES CITED

The following references are of record in the file of this patent:

UNITED STATES PATENTS

| Number | Name | Date |
| --- | --- | --- |
| 160,882 | Crowell | Mar. 16, 1875 |
| 491,914 | Adams | Feb. 14, 1893 |
| 1,002,550 | Wood et al. | Sept. 5, 1911 |
| 1,351,939 | Andre | Sept. 7, 1920 |
| 1,370,358 | Phillips | Mar. 1, 1921 |
| 1,610,498 | Duckett | Dec. 14, 1926 |
| 1,770,091 | Soss | July 8, 1930 |
| 2,236,433 | Klein | Mar. 25, 1941 |